Aug. 16, 1960  W. A. DERR  2,949,601
TELEMETERING APPARATUS
Filed May 2, 1955
4 Sheets-Sheet 2

INVENTOR
Willard A. Derr.

$2,949,601$

Patented Aug. 16, 1960

2,949,601

TELEMETERING APPARATUS

Willard A. Derr, Pittsburgh, Pa., assignor to Westinghouse Electric Corporation, East Pittsburgh, Pa., a corporation of Pennsylvania Filed May 2, 1955, Ser. No. 505,282

5 Claims. (Cl. 340—185)

My invention relates generally to telemetering, and it has reference in particular to apparatus for obtaining indications of any one of a number of different quantities from a remote location.

Generally stated, it is an object of my invention to provide in a simple and effective manner for using a single telemetering transmitter and receiver to obtain remote indications of a number of different quantities.

More specifically, it is an object of my invention to provide in a telemetering system for selectively connecting a single transmitter and receiver to a plurality of metering devices for obtaining indications of a plurality of different quantities from a remote location.

Another object of my invention is to provide for selectively connecting different ones of a plurality of meters at one location in a bridge circuit for responding to a common receiver, and for selectively connecting a common transmitter therefor, and which is located at a remote location, to different metering devices of which an indication is desired.

Yet, another object of my invention is to provide a reliable and inexpensive remote metering arrangement for selectively obtaining remote indications of a plurality of quantities.

It is also an object of my invention to provide in a supervisory control system for utilizing a remote metering system for obtaining indications of a plurality of quantities over a line supervision circuit for the supervisory control system by means of duration of pulse metering apparatus.

Other objects will, in part, be obvious and will, in part, be explained hereinafter.

In practicing my invention in accordance with one of its embodiments, a duration of pulse telemetering transmitter is selectively connected to a signaling channel at a remote station and to different ones of a plurality of metering devices through selection of a particular point in a supervisory control system associated therewith. A duration of pulse telemetering receiver at the dispatch office is used to vary the operating position of a potentiometer in a bridge circuit in response to the duration of pulses received from the remote station. Separate meters associated with each point are connected in the bridge circuit, depending on which point of the supervisory control is selected, so as to indicate the value measured at the corresponding point of the remote station.

For a more complete understanding of the nature and scope of my invention, reference may be made to the following detailed description which may be read in connection with the accompanying drawings, in which:

Figs. 1 through 4 are disposed to be arranged with Fig. 2 above Fig. 1, Fig. 3 to the right of Fig. 1 and Fig. 4 above Fig. 3 in a manner similar to Figs. 1 through 4 of the Derr Patent No. 2,597,075, which issued on May 20, 1952.

Figure 1:
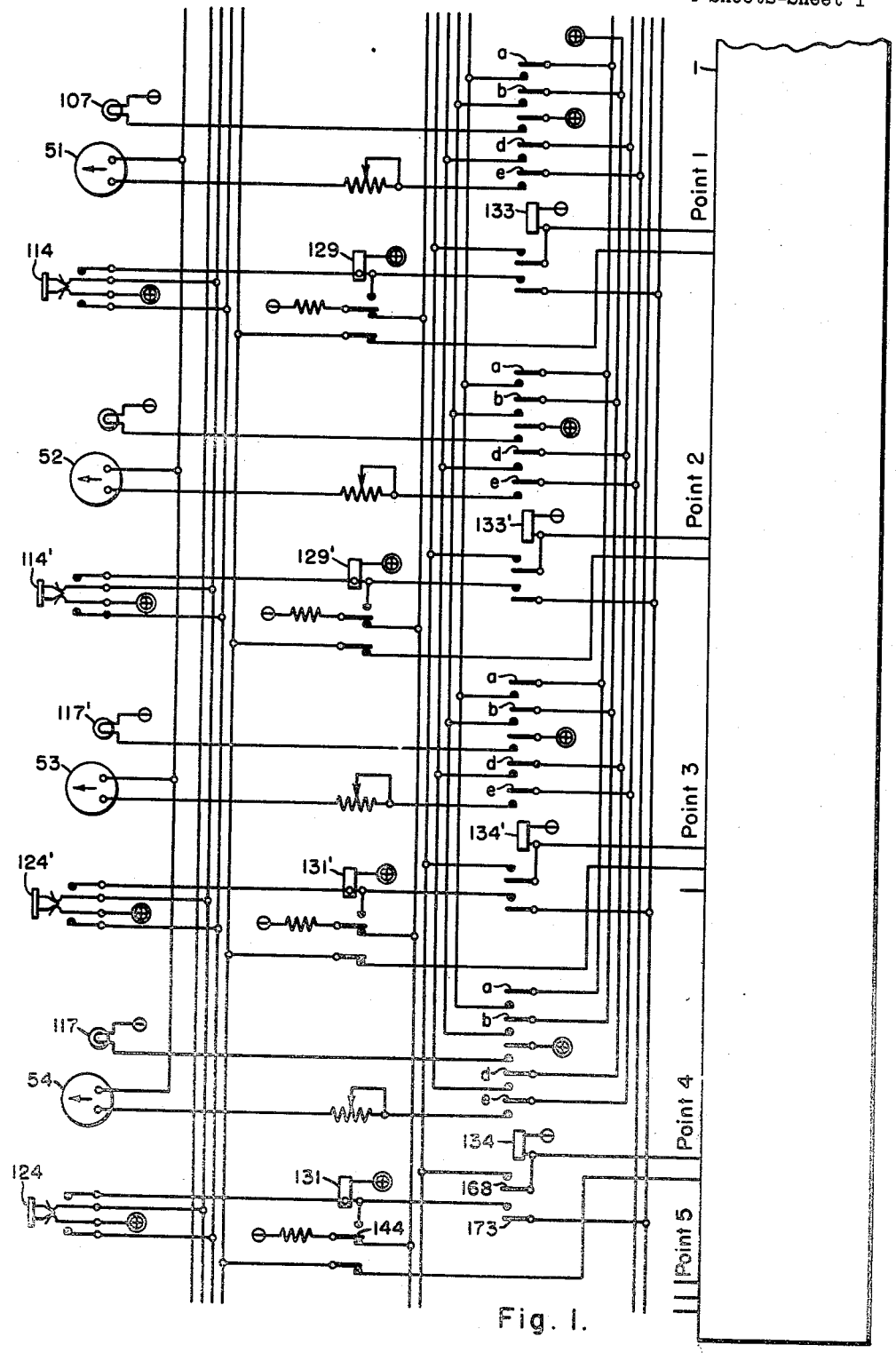
Fig. 1 is a diagrammatic view of metering equipment and individual point and counting equipment at a dispatching office in a supervisory control system embodying the invention in one of its forms.

When Figs. 1 through 4 are thus arranged, they represent a supervisory control system which is basically the same as the system which is shown in detail in the Derr patent. The operation of the supervisory control equipment is described in detail in the Boswau Patent 2,091,301 which issued on August 31, 1937. Portions of the equipment which are unchanged from that of the Derr patent are enclosed in boxes 1 and 2 at the dispatching office and remote substation, respectively. Certain relays of the Derr patent have been modified in order to provide additional circuit functions, and other relays perform different functions from those of the apparatus of the Derr patent. Entirely new elements are designated by reference characters not found in the Derr patent, whereas other elements which have been changed to any appreciable extent have been designated by means of prime numbers corresponding to the numbers used in the Derr patent in order to more readily identify them.

Figure 2:
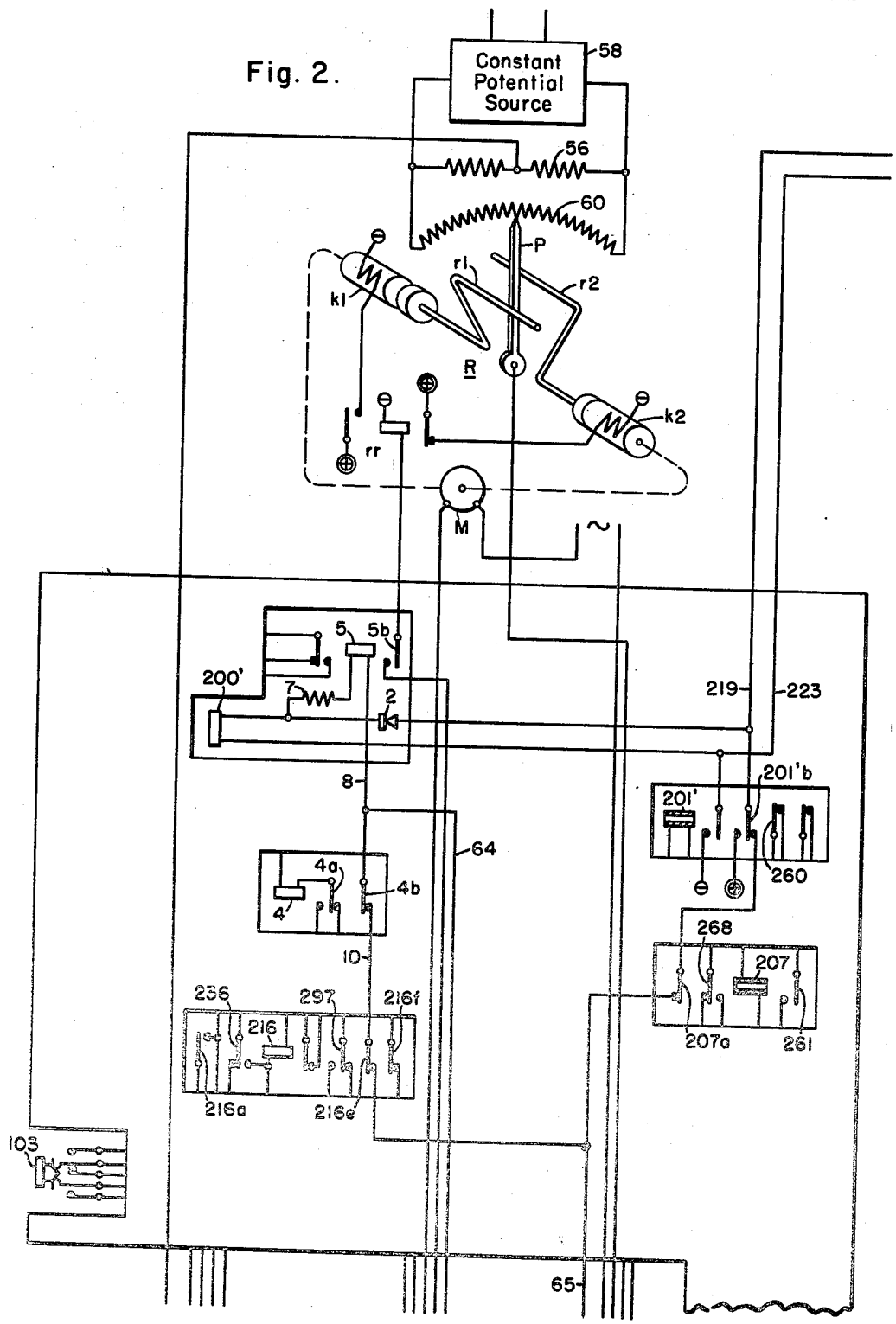
Fig. 2 is a diagrammatic view of the common equipment and telemetering receiver at the dispatching office.
Figure 3:
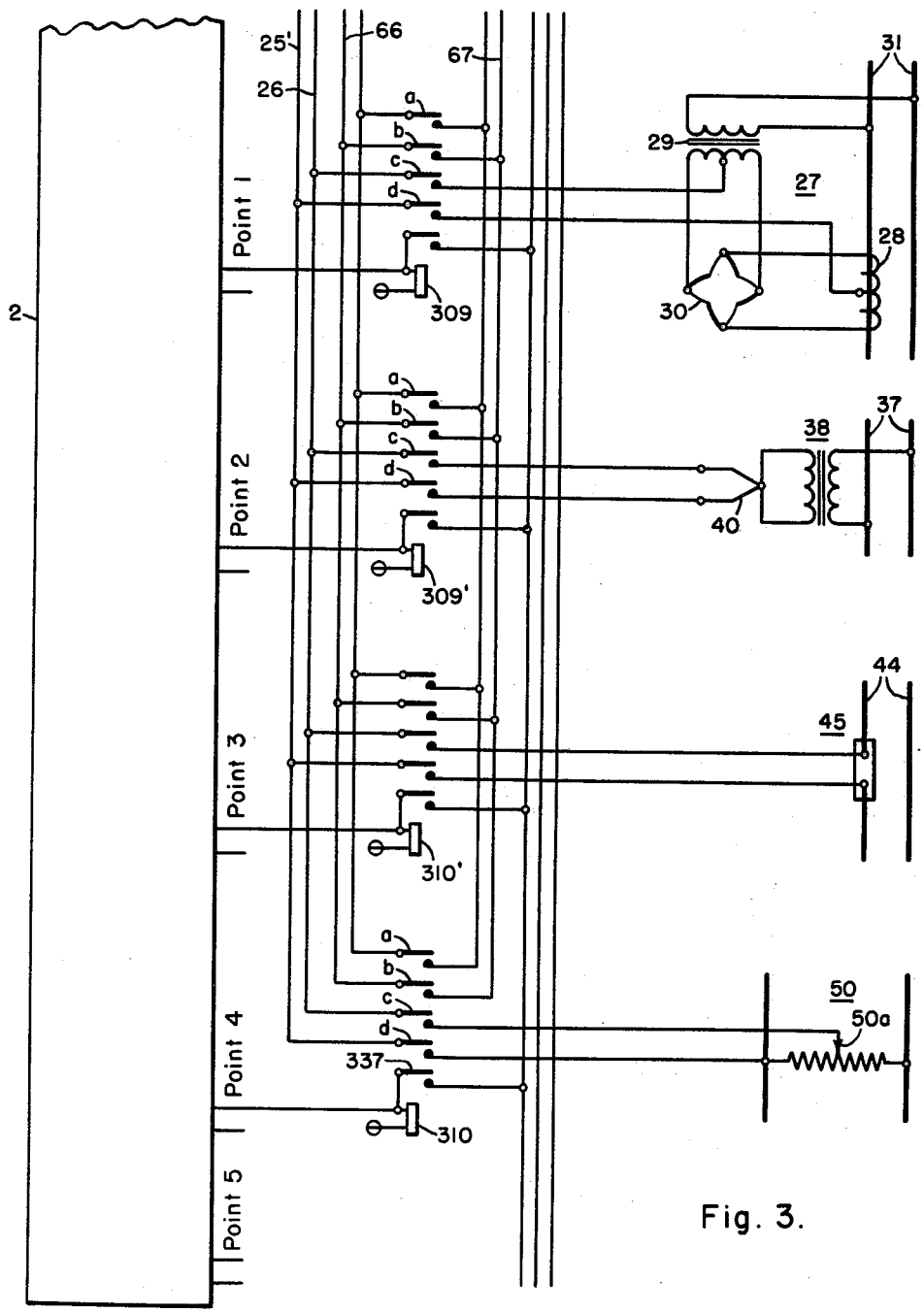
Fig. 3 is a diagrammatic view of the individual point and counting equipment, together with metering means at a remote substation associated with the dispatching office of Figs. 1 and 2.
Figure 4:
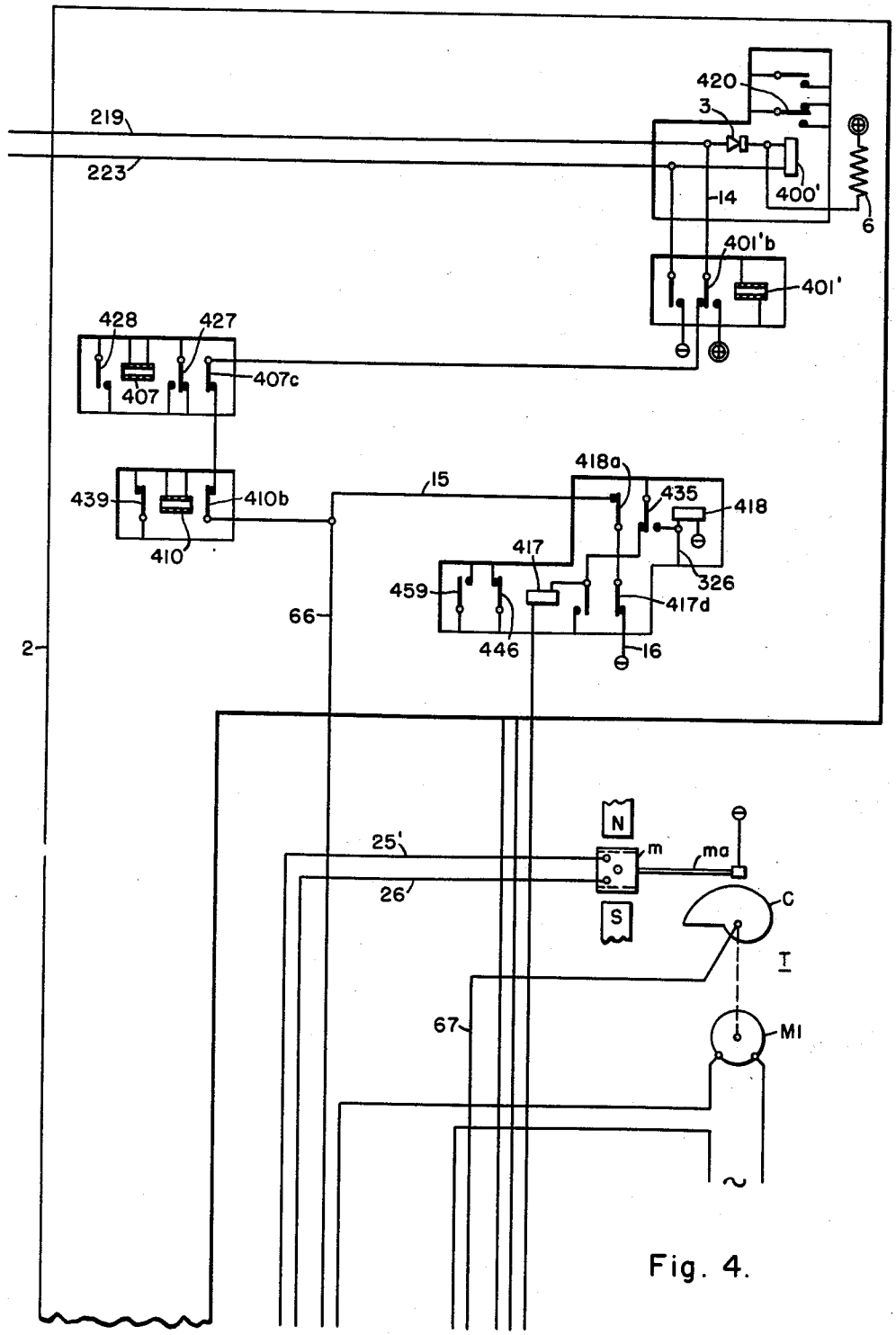
Fig. 4 is a diagrammatic view of the common equipment of the supervisory control system and the telemetering transmitter at the remote substation.

Referring to Figs. 2 and 4 of the drawings in particular, it will be seen that the line circuit comprising line relays 200' and 400' of the present application are connected in the same manner as in the Derr patent so as to provide a normally deenergized parallel circuit arrangement through the signal channel conductors 219 and 223.

The line supervision circuit in the present application is substantially the same as that of the Derr patent and comprises a line supervision relay 5 which is connected at the dispatching office across a rectifier device 2 disposed in conductor 219. The line supervision relay 5 is connected to the conductor 219 between the rectifier device 2 and the line relay 200' by means of a resistor 7. Thence, its circuit may be traced through the conductor 8, armature 4b of a receiving start relay 4, armature 216e of the sending start relay 216, armature 207a of the receiving drive relay 207 and armature 201'b of the sending relay 201'. The armatures of these relays are incorporated in the circuit of the line supervision relay for the purpose of disconnecting the line supervision relay from the signal channel during receiving or sending supervisory control operations. Relays 4 and 216 are energized at the beginning of receiving and sending operations, respectively, and remain energized until the supervisory equipment resets. Relays 207 and 201' are energized only during receiving and sending operations.

The line supervision relay 5 is normally energized over the conductors 219 and 223 by a reverse current which is circulated therethrough from the remote station battery. A rectifier device 3 is connected in the conductor 219 at the remote substation, and a connection is made to the line conductor between the rectifier device and the line relay 400' by means of a resistor 6 which connects to the positive terminal of the station battery. The conductor 219 is connected to the negative terminal of the station battery by means of conductor 14, armature 401'b of the substation sending relay 401, armature 407c of the substation receiving drive relay 407, armature 410b of the office preference relay 410, conductor 15, armature 418a of the substation receiving start relay 418 and armature 417d of the substation sending start relay 417 to negative battery. Relays 417 and 418 are energized at the beginning of sending and receiving operations, respectively, and remain energized until the supervisory equipment is reset. Relay 410 is energized during selection, while relays 407 and 401′ are energized during receiving and sending, respectively.

In order to transmit indications from a number of metering devices 27, 38, 45 and 50 at the remote substation, provision is made to connect these metering devices to the operating element of a telemetering transmitter T. The metering device 27 may be of the thermal converter type, including a current transformer 28 and a potential transformer 29 connected to alternating-current conductors 31 and to a thermal converter circuit 30 for producing a direct-current output proportional to the power of the alternating-current circuit. The output of the thermal converter 30 is connected through armatures $c$ and $d$ of the point relay 309 associated with Point 1 to the operating element $m$ of a telemetering transmitter T by means of conductors 25′ and 26. The metering device 38 may be of any suitable type comprising, for example, a potential transformer 33 connected to a thermal element 40 whose output is applied to the operating element $m$ of the transmitter T through armatures $c$ and $d$ of point relay 309′ associated with Point 2 of the supervisory system. The metering device 45 may comprise a shunt for measuring the current in the direct-current circuit represented by conductors 44. The output of the shunt is likewise connected to the operating element $m$ of the transmitter T through armatures $c$ and $d$ of point relay 310′ associated with Point 3 of the supervisory system. The metering device 50 may comprise a voltage divider having a moving contact arm 50$a$ which may be actuated to indicate water level, gate position or the like, and the voltage thereof may be applied to the operating element $m$ of the transformer T through armatures $c$ and $d$ of the point relay 310 associated with Point 4 of the supervisory system.

The transmitter T may be of the variable duration of pulse type similar to that described in Patent No. 2,644,931, which issued on July 7, 1953, to Derr et al. comprising a cam C which is driven by a motor M1 for engaging contact arm $ma$ of the operating or meter element $m$. The operating circuit for the motor may be completed through armatures $a$ of the point relays 309, 309′, 310 and 310′ so that the motor operates continuously, only so long as a metering point is selected. The cam C is adapted to engage a moving contact arm $ma$ of the operating or meter element $m$ for different portions of its operating cycle, depending on the operating position of the arm $ma$. This position is determined by the value or electrical quantity applied to the meter element $m$ from the different meter devices. The duration of this pulse may, for example, vary from substantially zero up to about 3 seconds of a 5-second cycle depending on the value of the quantity measured, with the remainder of the cycle comprising an "off" or "reset" interval.

At the dispatching office, a telemetering receiver R is provided similar to that described in the Derr et al. patent, having a motor M for selectively operating one or the other of a pair of arms $r1$ or $r2$ to actuate a pointer P in opposite directions, as determined by the energization or deenergization of solenoid clutches $k1$ and $k2$. Energization of these clutches is selectively controlled by a receiving relay $rr$ which is disposed to be energized for varying intervals in each five second cycle, in response to operation of the line supervision relay 5 through armature 5$b$, as a result of the variable duration pulses transmitted by the transmitter T. The different points of the supervisory system are provided with meters 51, 52, 53 and 54 associated with each of Points 1, 2, 3 and 4. These meters are connected through armatures $e$ of the point relays 133, 133′, 134″, and 134 to the pointer P and to the mid-point of a voltage divider 56, in a Wheatstone bridge arrangement. The divider 56 is connected across a constant potential source of direct current 58 in conjunction with a potentiometer 60 of which the pointer P forms a movable contact arm.

Since the receiving start relay 4 and the sending start relay 216 pick up with the first incoming and outgoing pulse, respectively, and remain picked up until the equipment is reset, either by pushing the release or reset key 103 or at the end of a control operation, a shunt circuit is provided by means of conductors 64 and 65 through the $a$ armatures of each of the point relays. This provides for completing the energization circuit for the line supervision relay 5 when it is desired to operate it in response to a metering pulse transmitted from the remote station. The circuit for the motor M is completed through the $d$ armature of each of the point relays, so as to provide an energizing circuit for the motor, only when a metering point is selected. The operating circuit for the receiving relay $rr$ is completed through the $b$ armature of each of the point relays so that the normal operation of the line supervision relay 5 when supervising the line will not cause operation of the telemetering receiver R.

To obtain a reading from any one of the several metering devices 27, 38, 45 and 50, the operator merely selects the particular point of the supervisory equipment with which it is associated, by pushing the respective key 114, 114′, 117′ or 117. Should the operator desire, for example, to obtain a reading of the metering device 27, he depresses the point selection key 114 associated with Point 1. This shunts down the individual point relay 129 and causes the transmission of a selection code of two pulses in a manner similar to that of the apparatus in the Derr patent, as is described in detail in a prior Boswau Patent No. 2,091,301, which issued on August 31, 1937. Operation of the sending relay 201′ at transmitting the two pulses momentarily interrupts the energizing circuit for the line supervision relay 5 at armature 210′$b$. The circuit is also interrupted at armature 216$e$ of the start relay 216.

At the remote substation, the receiving start relay 418 is energized as is also the office preference relay 410, thus interrupting the circuit for the line supervision relay at armatures 418$a$ and 410$b$. Upon receipt of the selection code of two pulses, point relay 309 of Point 1 is energized and sets up a telemetering circuit by connecting the metering means 27 to the operating element $m$ of the telemetering transmitter T through armatures $c$ and $d$. At the same time, the operating circuit for the motor M1 is completed through armature $a$, and the cam C of the telemetering transmitter is connected through armature $b$ to conductor 66 for connection to conductor 219 of the signal channel when the office preference relay resets a delayed interval after the end of the selection code.

Upon operation of the point relay 309, a selection check code is transmitted in the usual manner which results in energization of the point relay 133 of Point 1 at the dispatching office. This provides a shunt through armature $a$ around the armature 216$e$ of the start relay 216, completes a circuit for the receiving relay $rr$ through armature $b$, completes the operating circuit for the motor M through armature $d$, and connects the meter 51 between the mid-point of the voltage divider 57 and the pointer P of the telemetering receiver through armature $e$. At the end of the check code, the supervisory equipment will be at rest, although not reset, and the telemetering transmitter T will be connected to the signal channel at the substation through conductors 67, armature $b$ of point relay 309, conductor 66, armature 410$b$, armature 407$c$ and armature 401′$b$. The line supervision relay 5 will thereupon be energized in each cycle of operation of the cam C, for a duration which is dependent on the position of the operating element contact arm $ma$. Accordingly, the pointer P will be actuated along the resistance 60 to a position which corresponds to the duration of the impulse. The meter 51 connected between the pointer P and the mid-point of the voltage divider 56 will thus read in accordance with the duration of the pulse transmitted. At the end of the reading, the equipment may be reset in the usual manner by operating the usual release key 103.

From the above description and the accompanying drawings, it will be apparent that I have provided in a simple and effective manner for selectively obtaining readings from a plurality of meter devices at a remote location. Since telemetering transmitters and receivers are relatively expensive pieces of apparatus, a great economy is obtained by utilizing a single transmitter and a single receiver for obtaining a plurality of independent indications.

Since certain changes may be made in the above-described construction and different embodiments of the invention may be made without departing from the spirit and scope thereof, it is intended that all the matter contained in the above description and shown in the accompanying drawings shall be illustrative and not in a limiting sense.

I claim as my invention:

1. Telemetering apparatus comprising, a receiver having a variable position potentiometer adjustable in accordance with the duration of an applied signal, means connecting said potentiometer in a bridge circuit, and means for selectively connecting different meters in said bridge circuit between said potentiometer and a voltage divider forming with the potentiometer a bridge circuit.

2. In a telemetering apparatus, a plurality of indicating means, a common receiver operable to position an adjustable voltage divider in response to the duration of a signal which is in accordance with a quantity to be measured, circuit means connecting the adjustable divider in a Wheatstone bridge circuit, and circuit means selectively connecting in the bridging circuit of the Wheatstone bridge circuit different ones of the indicating means.

3. In combination, supervisory control equipment at a dispatching office including a plurality of point relays each operable in response to selection of a different point of the equipment, a common bridge circuit including an adjustable voltage divider element, means including a telemetering receiver operable to actuate the adjustable divider element, a plurality of indicating meters, and circuit means including a contact of a different point relay connecting each indicating meter in the common bridge circuit.

4. In a supervisory control system, supervisory control equipment at each of a dispatching office and a remote station including sending and receiving relays operable to transmit and receive coded signals over a signal channel, and a point relay selectively operable in response to selection of each control point, a plurality of metering means at the remote station for producing output signals of amplitudes in accordance with quantities to be metered, a single duration of the pulse telemetering transmitter at the remote station having input and output circuits, circuit means including contacts of each point relay operable to connect the input circuit to a different one of said metering means and the output circuit to the signal channel, a single duration of pulse telemetering receiver at the dispatching office, a potentiometer operated by the receiver circuit means connecting the potentiometer in a Wheatstone bridge circuit, a plurality of meters, and circuit means including a contact of a different point relay operable to selectively connect different ones of the meters in the bridge circuit.

5. In a supervisory control system, supervisory control equipment at each of a dispatching office and a remote station including a point relay for each of a plurality of points, means connecting the dispatching office and the remote station including a signal channel having a receiving relay and a supervisory sending relay at each end, a plurality of metering means and a common duration of pulse type telemetering transmitter at the remote station, circuit means including contacts of each point relay at the remote station connecting the transmitter to a different one of the metering means and to the signal channel, a Wheatstone bridge circuit at the dispatching office including an adjustable voltage divider element, a telemetering receiver operable to actuate said divider element to different positions in response to signals of different durations from the transmitter, a plurality of indicating meters at the dispatching office, and circuit means including contacts of each point relay at the dispatching office selectively operable to connect a different indicating meter in the bridge circuit and connect the receiver to the channel.

References Cited in the file of this patent

UNITED STATES PATENTS

| 502,399 | Haskins | Aug. 1, 1893 |
| 1,361,676 | Brewer | Dec. 7, 1920 |
| 2,215,254 | Ryder | Sept. 17, 1940 |
| 2,379,293 | Goddard | June 26, 1945 |
| 2,388,966 | Harrison | Nov. 13, 1945 |
| 2,443,351 | Green | June 15, 1948 |
| 2,578,447 | Odell | Dec. 7, 1951 |
| 2,597,075 | Derr | May 20, 1952 |
| 2,644,931 | Derr | July 7, 1953 |

OTHER REFERENCES

"Principles and Methods of Telemetering," by Perry A. Borden et al., Reinhold Publishing Corp., 1948 (page 149 relied on).